US008745126B2

(12) United States Patent
Watanabe

(10) Patent No.: US 8,745,126 B2
(45) Date of Patent: Jun. 3, 2014

(54) METHOD OF PROCESSING DISTRIBUTED COMPUTING SYSTEM

(75) Inventor: Noritaka Watanabe, Tokyo (JP)

(73) Assignee: Tribeth Inc., Tokyo (JP)

( * ) Notice: Subject to any disclaimer, the term of this patent is extended or adjusted under 35 U.S.C. 154(b) by 246 days.

(21) Appl. No.: 13/474,122

(22) Filed: May 17, 2012

(65) Prior Publication Data

US 2012/0254287 A1    Oct. 4, 2012

Related U.S. Application Data

(63) Continuation of application No. PCT/JP2011/058547, filed on Apr. 4, 2011.

(30) Foreign Application Priority Data

Aug. 2, 2010   (JP) ................................ 2010-173944

(51) Int. Cl.
*G06F 15/16*   (2006.01)
(52) U.S. Cl.
USPC ......................................................... 709/202
(58) Field of Classification Search
CPC ................................................... G06F 11/187
USPC ................................................. 709/201, 202
See application file for complete search history.

(56) References Cited

U.S. PATENT DOCUMENTS 7,565,433 B1 *   7/2009   Lamport ....................... 709/227
2005/0149609 A1 *   7/2005   Lamport ....................... 709/200

FOREIGN PATENT DOCUMENTS

JP   A-2005-196763   7/2005
JP   A-2006-004433   1/2006
JP   A-2006-155614   6/2006

* cited by examiner

*Primary Examiner* — Wing F Chan
*Assistant Examiner* — Andrew Woo
(74) *Attorney, Agent, or Firm* — Oliff PLC

(57) ABSTRACT

A processing method for a distributed computing system includes a round proposal signal transmission step, a round accept signal transmission step, a round-winning judgment step, an instance proposal signal transmission step, an instance accept signal transmission step, an instance consensus judgment step, an instance execution instruction signal transmission step, an instance execution step. In the instance consensus judgment step, a leader judges whether or not a condition regarding reception of the instance accept signal is satisfied, on the basis of whether or not the number of agents from which the leader has received the instance accept signal is greater than or equal to a number obtained by subtracting one from the majority of servers constituting a cell. In the instance proposal signal transmission step, the leader transmits, to each agent, the instance proposal signal for other instances without confirming satisfaction of the condition regarding reception of the instance accept signal.

2 Claims, 9 Drawing Sheets

Fig.6A

ROUND PROPOSAL SIGNAL

| Collect TYPE | TRANSMISSION SOURCE SERVER DEVICE NUMBER | TRANSMISSION DESTINATION SERVER DEVICE NUMBER | ROUND VALUE | BLOCK NUMBER | |
|---|---|---|---|---|---|
| | INSTANCE SERIAL NUMBER | FLAG INFORMATION | PROPOSED ROUND VALUE | PROPOSAL VALUE METADATA | |
| | . . | . . | . . | . . | B PIECES |
| | INSTANCE SERIAL NUMBER | FLAG INFORMATION | PROPOSED ROUND VALUE | PROPOSAL VALUE METADATA | |

Fig.6B

ROUND ACCEPT SIGNAL

| Last TYPE | TRANSMISSION SOURCE SERVER DEVICE NUMBER | TRANSMISSION DESTINATION SERVER DEVICE NUMBER | ROUND VALUE | BLOCK NUMBER | |
|---|---|---|---|---|---|
| | INSTANCE SERIAL NUMBER | FLAG INFORMATION | PROPOSED ROUND VALUE | PROPOSAL VALUE METADATA | |
| | . . | . . | . . | . . | B PIECES |
| | INSTANCE SERIAL NUMBER | FLAG INFORMATION | PROPOSED ROUND VALUE | PROPOSAL VALUE METADATA | |

Fig.6C

ROUND DENIAL SIGNAL

| Old Round 1 TYPE | TRANSMISSION SOURCE SERVER DEVICE NUMBER | TRANSMISSION DESTINATION SERVER DEVICE NUMBER | ROUND VALUE |
|---|---|---|---|

Fig.7A

DETERMINED DATA REQUEST SIGNAL

| DETERMINED DATA REQUEST TYPE | TRANSMISSION SOURCE SERVER DEVICE NUMBER | TRANSMISSION DESTINATION SERVER DEVICE NUMBER | INSTANCE SERIAL NUMBER |
|---|---|---|---|

Fig.7B

DETERMINED DATA RESPONSE SIGNAL

| DETERMINED DATA RESPONSE TYPE | TRANSMISSION SOURCE SERVER DEVICE NUMBER | TRANSMISSION DESTINATION SERVER DEVICE NUMBER | INSTANCE SERIAL NUMBER | PROPOSAL VALUE METADATA | PROPOSAL VALUE SUBSTANCE DATA |
|---|---|---|---|---|---|

Fig.8A

INSTANCE PROPOSAL SIGNAL

| Begin TYPE | RETURN DESTINATION SERVER DEVICE NUMBER | TRANSMISSION DESTINATION SERVER DEVICE NUMBER | ROUND VALUE | INSTANCE SERIAL NUMBER | PROPOSAL VALUE METADATA | PROPOSAL VALUE SUBSTANCE DATA |
|---|---|---|---|---|---|---|

Fig.8B

INSTANCE PROPOSAL SUBSTITUTION SIGNAL

| Begin REDIRECT TYPE | TRANSMISSION SOURCE SERVER DEVICE NUMBER | TRANSMISSION DESTINATION SERVER DEVICE NUMBER | RETURN DESTINATION SERVER DEVICE NUMBER | ROUND VALUE | INSTANCE SERIAL NUMBER |
|---|---|---|---|---|---|

Fig.9A

INSTANCE ACCEPT SIGNAL

| Accept TYPE | TRANSMISSION SOURCE SERVER DEVICE NUMBER | TRANSMISSION DESTINATION SERVER DEVICE NUMBER | INSTANCE SERIAL NUMBER |
|---|---|---|---|

Fig.9B

INSTANCE DENIAL SIGNAL

| Old Round 2 TYPE | TRANSMISSION SOURCE SERVER DEVICE NUMBER | TRANSMISSION DESTINATION SERVER DEVICE NUMBER | ROUND VALUE |
|---|---|---|---|

Fig.9C

INSTANCE EXECUTION INSTRUCTION SIGNAL

| Success TYPE | TRANSMISSION SOURCE SERVER DEVICE NUMBER | TRANSMISSION DESTINATION SERVER DEVICE NUMBER | INSTANCE SERIAL NUMBER | PROPOSAL VALUE METADATA | PROPOSAL VALUE SUBSTANCE DATA |
|---|---|---|---|---|---|

METHOD OF PROCESSING DISTRIBUTED COMPUTING SYSTEM

This is a Continuation of International Application No. PCT/JP2011/058547 filed Apr. 4, 2011, which claims the benefit of Japanese Application No. 2010-173944 filed Aug. 2, 2010. The disclosure of the prior applications are hereby incorporated by reference herein in their entirety.

TECHNICAL FIELD

The present invention relates to a processing method for a distributed computing system.

BACKGROUND ART

In recent years, attention has been drawn to distributed computing aimed at efficient use of resources and the like. Such distributed computing is called cloud and offers various types of services. In distributed computing, a plurality of computing devices constituting a cell executes tasks instructed by a client in coordination with one another. It is thus necessary to achieve consensus among the computing devices. One example of algorithms for achieving consensus in this manner is the Paxos algorithm described in, for example, PLT 1 through PLT 3.

The Paxos algorithm is a consensus algorithm according to which servers constituting a cell act as a leader or an agent. The Paxos algorithm works such that, before the distributed computing system executes a predetermined command, it is checked whether or not a majority of the servers constituting the cell agrees on the execution of the command; if consensus is achieved to that effect, the execution is started. Use of such an algorithm allows easily synchronizing the computing devices, thus achieving high availability.

To be more specific, according to the Paxos algorithm (Simple Paxos), a leader that has received a request from a client transmits a round value, which is a proposal number indicating the details of Paxos consensus, to other servers acting as agents [proposal of round value].

Each agent compares a round value stored therein with the round value received from the leader. If the stored round value is greater than the received round value, each agent returns a denial signal to the leader. If not, each agent accepts the transmitted proposal and returns an accept signal [acceptance].

When the number of agents from which the leader has received the accept signal is greater than or equal to a number obtained by subtracting one from a majority of all servers (because the leader itself agrees on the execution), the leader selects a predetermined one of proposals returned from the agents, if any. In the absence of such proposals, the leader selects the proposal made by the client, and then transmits the selected proposal to other agents with a round value appended thereto. The agents compare the round value stored therein with the round value received from the leader. If the stored round value is greater than the received round value, the agent returns a denial signal to the leader. If not, the agent accepts the transmitted proposal and returns an approve signal [approval].

When the number of agents from which the leader has received the approve signal is greater than or equal to a number obtained by subtracting one from a majority of all servers (because the leader itself agrees on the execution), the leader determines that consensus has been achieved [achievement of consensus] (the Paxos algorithm guarantees that this determination is not overturned).

Then, the leader instructs execution of the instance, and the processing moves to the execution of the instance on which consensus has been achieved [execution of instance].

Subsequently, instances are continuously executed. Upon execution of each instance, processing such as proposal of a round value, acceptance, approval, achievement of consensus (hereinafter, "round-winning"), and execution of the instance is performed again. This method is extremely inefficient because a sequence of round-winning processes must be performed for each instance.

In order to solve the above problem, a Multi-Paxos scheme has been proposed whereby, once consensus has been achieved on a round value, it is assumed that consensus has been reached on winning the round, and the processing moves to achievement of consensus on an instance and execution of the instance. The Multi-Paxos scheme is advantageous in that, once processing from proposal of a round value through achievement of consensus on the round value has been performed, these steps become unnecessary.

CITATION LIST

Patent Literature

[PLT 1]
JP 2005-196763A
[PLT 2]
JP 2006-004433A
[PLT 3]
JP 2006-155614A

SUMMARY OF INVENTION

Technical Problem

However, the Multi-Paxos scheme still requires that, in processing a plurality of instances, instances targeted for execution must be executed sequentially while achieving consensus on the content of each individual instance. Therefore, the Multi-Paxos scheme is problematic in that, aside from omission of round-winning processes, the processing speed cannot be improved as compared to conventional methods.

The present invention has been conceived to solve the above problem, and aims to provide a processing method for a distributed computing system that enables parallel processing by multi-processing a plurality of instances.

Solution to Problem

To achieve the above aim, the present invention has the following characteristics.

According to a processing method for a distributed computing system of the present invention, the distributed computing system includes a plurality of computing devices constituting a cell. A part of the plurality of computing devices acts as a leader, and the remaining computing devices act as agents. The distributed computing system determines a group of instances composed of a plurality of instances to be executed by the plurality of computing devices through achievement of consensus with use of a Paxos algorithm, and executes the group of instances in a predetermined order of execution. The processing method for the distributed computing system comprises: a round proposal signal transmission step in which the leader transmits, to each agent, a round proposal signal including a round value and identification information of the group of instances (including metadata), the round value being a proposal number indicating contents of the group of instances to be executed, the group of instances being grouped to include a predetermined number of instances; a round accept signal transmission step in which each agent compares the received round value with a round value stored therein, and when the received round value is greater than or equal to the stored round value, transmits a round accept signal indicating acceptance of the received round value to the leader; a round-winning judgment step in which the leader judges whether or not a condition regarding reception of the round accept signal is satisfied, on the basis of whether or not the number of agents from which the leader has received the round accept signal is greater than or equal to a number obtained by subtracting one from a majority of the computing devices constituting the cell; an instance proposal signal transmission step in which, when the condition regarding reception of the round accept signal is satisfied, an instance proposal signal is successively transmitted to each agent in accordance with a desired order, the instance proposal signal including the round value and substance data that is associated with the identification information of a target instance among the group of instances and is necessary for execution of the target instance; an instance accept signal transmission step in which, upon receiving the instance proposal signal, each agent compares the round value corresponding to each instance with a round value stored therein, and when the received round value is greater than or equal to the stored round value, transmits an instance accept signal indicating acceptance of execution of the target instance to the leader; an instance consensus judgment step in which the leader judges whether or not a condition regarding reception of the instance accept signal is satisfied, on the basis of whether or not the number of agents from which the leader has received the instance accept signal is greater than or equal to the number obtained by subtracting one from the majority of the computing devices constituting the cell; an instance execution instruction signal transmission step in which, when the condition regarding reception of the instance accept signal is satisfied, an instance execution instruction signal is transmitted to each agent so as to instruct each agent to execute the target instance in the predetermined order of execution until the number of executed target instances reaches the predetermined number; and an instance execution step in which, upon receiving the instance execution instruction signal, each agent executes the target instance. In the instance proposal signal transmission step, the leader transmits the instance proposal signal for other instances without confirming satisfaction of the condition regarding reception of the instance accept signal.

In the present invention, the identification information of the group of instances may be composed of metadata. This configuration is suitable as it allows promptly achieving consensus according to the Paxos algorithm, even when using a communication method with a limited communication capacity.

The round value is a proposal number indicating the contents of the group of instances to be processed which is proposed by the leader to each agent. The larger the round value, the stronger the round value. It is specified that a proposal number cannot be processed if it is smaller than a round value already processed.

Note, instances denote a substance of processing including commands for executing a predetermined task.

It is necessary to satisfy the above condition regarding reception of the instance accept signal in order to execute a target instance. Incidentally, while the present invention is embodied under the premise that the instances are executed in a predetermined order of execution, the present invention employs processing in which the leader transmits, to agents, the instance proposal signal for instances other than the instance targeted for execution, without confirming that the instance targeted for execution satisfies the condition regarding reception of the instance accept signal (so-called independent control). In this independent control of the present invention, the leader successively transmits, to agents, the instance proposal signal for the instances with other serial numbers. This way, the instances can be multi-processed, thus realizing parallel processing of the instances. As a result, the wait time required to achieve consensus on execution of the instances using the Paxos algorithm can be made as short as possible, and accordingly, a plurality of instances can be promptly executed.

Advantageous Effects of Invention

The present invention enables parallel processing by multi-processing a plurality of instances, thus realizing high-speed processing for a distributed computing system.

BRIEF DESCRIPTION OF DRAWINGS

FIG. 6A shows a round proposal signal. FIG. 6B shows a round accept signal. FIG. 6C shows a round denial signal.

FIG. 7A shows a determined data request signal. FIG. 7B shows a determined data response signal.

FIG. 8A shows an instance proposal signal. FIG. 8B shows an instance proposal substitution signal.

FIG. 9A shows an instance accept signal. FIG. 9B shows an instance denial signal. FIG. 9C shows an instance execution instruction signal.

DESCRIPTION OF EMBODIMENTS

The following describes an embodiment of the present invention in detail with reference to the drawings.

<Overall Structure of Distributed Computing System S>

Figure 1:
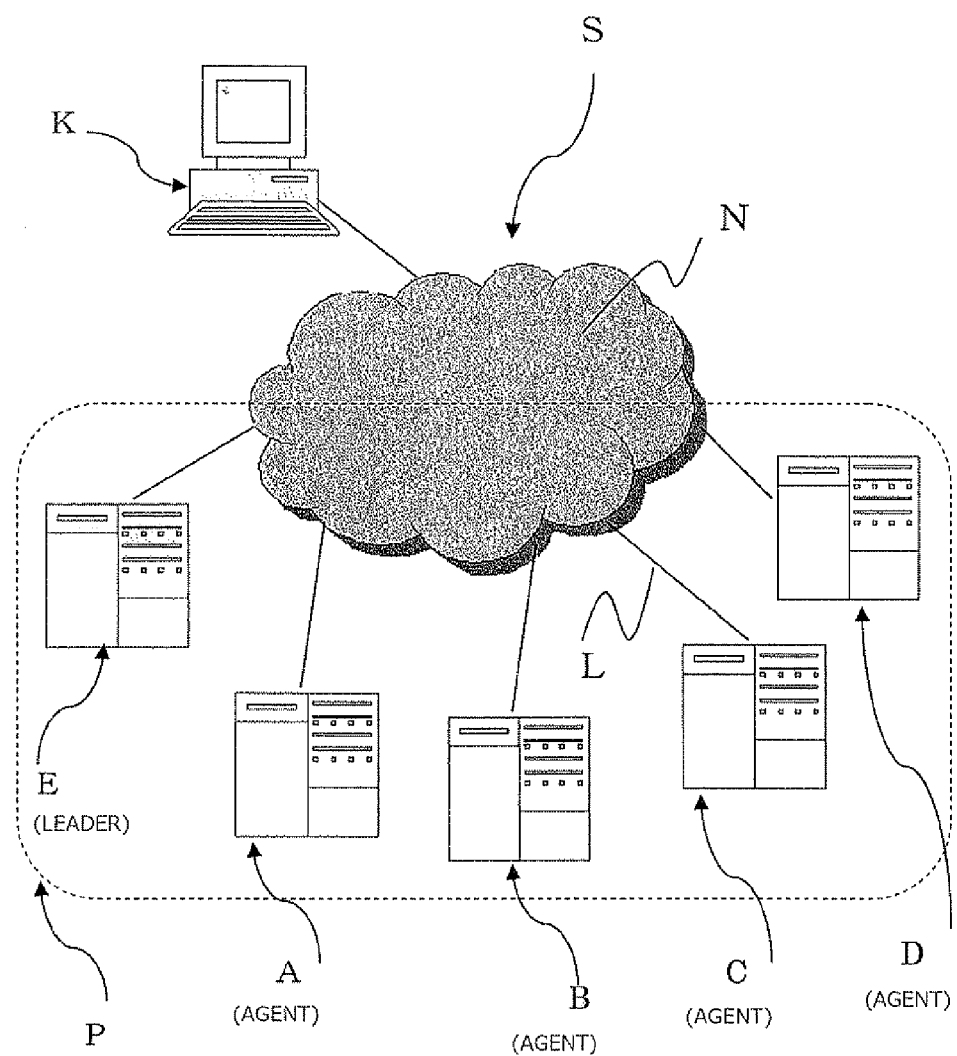
FIG. 1 illustrates a distributed computing system of the present invention.
Figure 2:
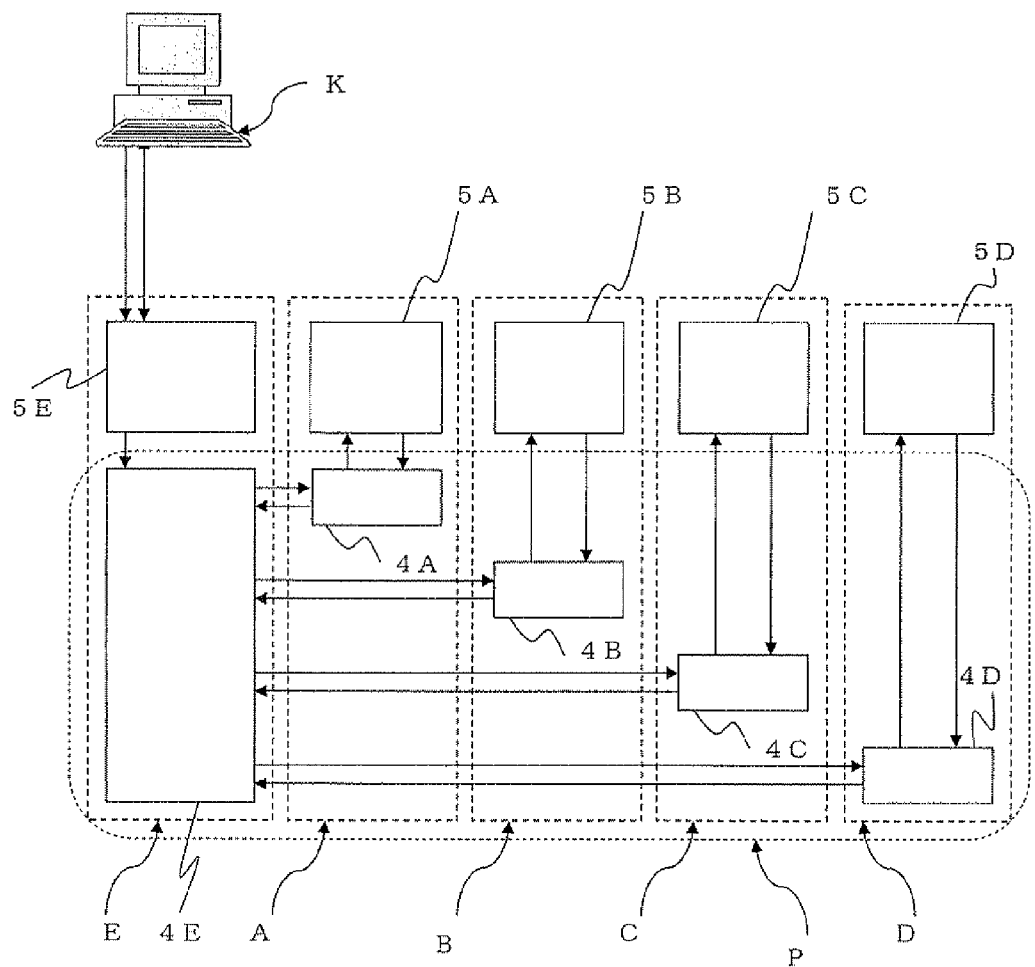
FIG. 2 shows a schematic structure of the distributed computing system of the present invention.

As shown in FIGS. 1 and 2, a distributed computing system S of the present invention (hereinafter, "the present system") is constituted by a plurality of servers (computing devices) connected via a network N, such as the Internet, and via a local area network (LAN) L. For the sake of convenience, the following description provides an example in which one leader server E (hereinafter, "leader") and four agent servers A-D (hereinafter, "agents") are present (note that these five serves may be collectively referred to as "each server" below).

In the present system S, a part (normally one) of a plurality of servers constituting a cell P acts as the leader E, and the remaining servers act as the agents A-D. Here, a plurality of instances (hereinafter, "a group of instances") to be executed are determined through achievement of consensus using the Paxos algorithm, and the group of instances is executed in sequence.

The leader E is determined in advance by a predetermined method (e.g. a so-called seniority method whereby a server that joined the present system S earliest becomes the leader).

Although the above servers A-E are described herein with different names, they are configured in a similar manner. Each of the servers A-E is a device capable of playing the roles of other servers in response to a request from a client K. Hence, the following description is given under the general rule that, when explaining the same constituent elements, the same reference sign is used therefor in a case where they are collectively referenced. However, when it is necessary to show differences in these constituent elements arising from differences in servers, A-E are further added to the end of the reference sign thereof to distinguish between these constituent elements.

As mentioned above, in the present system S, the servers A-E are connected to the client K that knows the IP addresses of the servers A-E via the network N. Each of the servers A-E can perform a desired task by receiving an instruction from the client K and executing instances such as calculation processing via an operation execution unit (not shown in the figures).

In the present embodiment, an application program for executing the instances, as well as a program designed for distributed computing to perform distributed processing on the instances, are preinstalled in the servers A-E.

Each of the servers A-E is a general-purpose computer including a central processing unit (CPU, not shown in the figures). However, for the sake of convenience, processor capabilities and storage capabilities of the CPUs and storage devices are described separately in terms of consensus achievement units 4A-4E and execution units 5A-5E (FIG. 2).

The consensus achievement units 4A-4E compose a Paxos device for achieving consensus by using the Paxos known to the cell P. The consensus achievement units 4A-4E are devices that can synchronize the servers A-E by realizing the following processing: before execution of a certain instance in the present system S, the leader E communicates with the agents A-D to check whether or not the number of servers that agree on execution of the instance constitutes a quorum or more; and if consensus is achieved to that effect, the execution is started (described later).

Furthermore, in accordance with the above-mentioned program designed for distributed computing, the consensus achievement units 4A-4E can pass metadata to one another by value using a method of communication within a predetermined band (e.g. UDP).

Note that the consensus achievement units 4A-4E are configured strictly to seek consensus on execution of instances. The instances to be executed are determined by the application program.

Furthermore, the execution units 5A-5E can execute tasks by applying the instances determined in the consensus achievement units 4A-4E to the application program.

<Processing Method for Distributed Computing System S>

The present system S is characterized in that the following three processes are performed to execute a plurality of instances, provided there is no change in the leader: winning a round once; achieving consensus on each instance; and executing each instance.

(Winning a Round)

Figure 3:
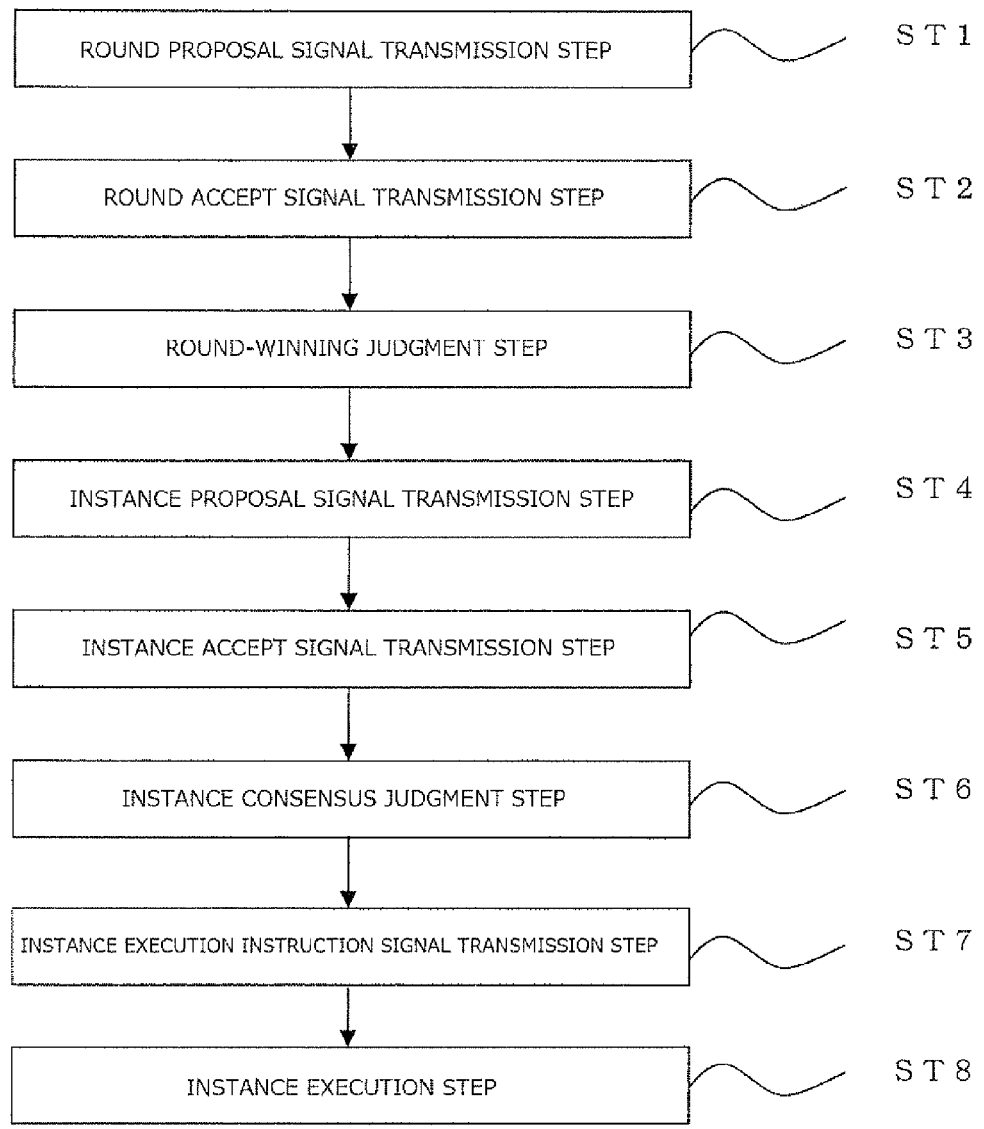
FIG. 3 is a flow diagram showing an outline of a processing method for distributed computing of the present invention.

First, the leader E has to win a round before execution of each instance. This process includes a round proposal signal transmission step (ST1), a round accept signal transmission step (ST2), and a round-winning judgment step (ST3) (FIG. 3).

A round is won (hereinafter, "round-winning") when, after the leader E transmits a round proposal signal (described later) including a round value which is a proposal number indicating the contents of a group of instances to be processed to the agents A-D, the leader E achieves consensus on execution of the contents of the group of instances among a certain number of agents A-D that equals "a majority of the servers A-E−1".

This round value consists of a preassigned device number of the leader E and a serial number, and is uniquely determined in the entirety of the present system S. Whether this round value is large or small is judged by comparing the serial number. In this case, the serial number is configured such that the larger the value of the serial number, the stronger the round value, and that in a case where the serial number is the same, the smaller the device number, the stronger the round value.

On the other hand, when the servers A-E propose a round value (hereinafter also expressed as "offer a round value"), it adds one to a serial number of a round value stored therein (hereinafter, "stored round value") and uses a device number thereof as a device number in the round value.

In the above manner, the servers A-E can propose a unique round value in the entirety of the present system S, thus preventing the execution of processing that is the same as groups of instances executed in the past.

(1) Round Proposal Signal Transmission Step (ST1)

Figure 4:
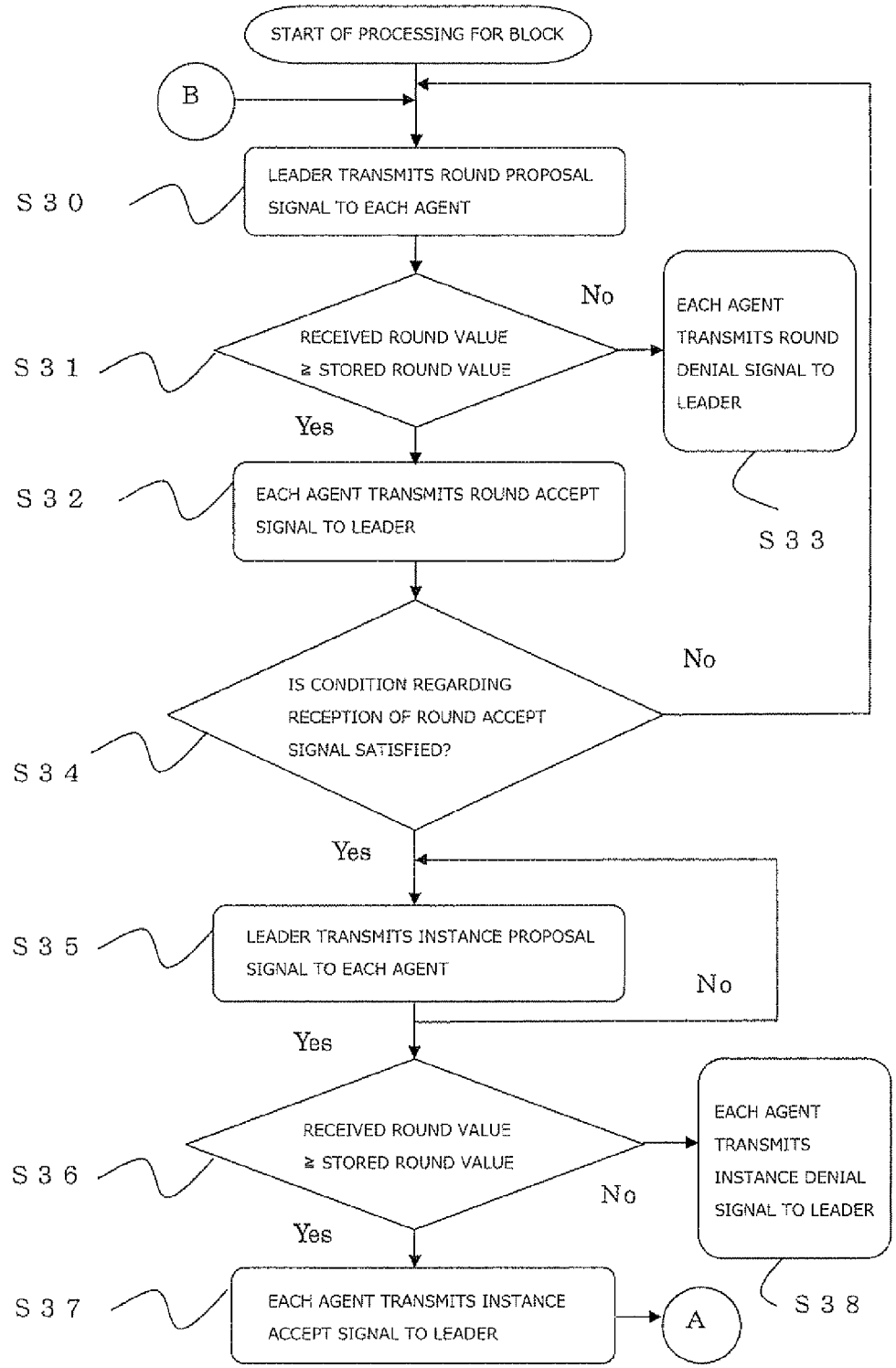
FIG. 4 is a flow diagram showing the details of the processing method for the distributed computing of the present invention.

As shown in FIG. 4, in the present step, the leader E performs processing for transmitting a round proposal signal to the agents A-D (S30). The round proposal signal includes a round value and identification information, corresponding to the round value, of a group of instances that are grouped to include a predetermined number of instances (in the present embodiment, the predetermined number is B) and indicate the contents of execution on which consensus should be achieved.

In the present system S, the leader E transmits data of a group of instances it proposes to the agents A-D, and the agents A-D determine subsequent processing by comparing the transmitted data of the group of instances with data indicating statuses of execution of instances in which they have been involved. Therefore, it is necessary that the round proposal signal include the identification information of B number of instances. However, because there are cases where a restriction is placed on the communication capacity and the like, only metadata of a proposal value (described later) required for execution of the corresponding instances (hereinafter, "proposal value metadata") is transmitted as the identification information of the group of instances.

As will be described later, substance data of the proposal value (hereinafter, "proposal value substance data") is required to execute the instances. Since the proposal value substance data is associated with the identification information of the respective instances, it should not give rise to any problem in data processing.

The above round proposal signal is composed of data including: a round proposal (commonly called Collect) type which is identification information for distinguishing between data types; a preassigned transmission source server device number (the device number of the leader E); a preassigned transmission destination server device number (device numbers of the agents A-D); a round value; a block number; and identification information of B number of instances constituting one block (instance serial number, flag information, proposed round value, and proposal value metadata) (FIG. 6A).

Here, the proposal value metadata is composed of a device number of a server that originally held the proposal value substance data necessary for executing a target instance; and a device number of a proposer server that currently holds the proposal value substance data.

The proposed round value is a round value that is stored in the leader E when the leader E offers (transmits) the same to the agents A-D.

The flag information is data showing the following three statuses of processing of each instance: determined (a status in which an instance execution instruction signal (described later) has been transmitted, i.e. a status in which consensus has been achieved on the instance); being proposed (a status in which an instance proposal signal (described later) has been transmitted); and not proposed (a status in which the instance proposal signal has not been transmitted).

The instance serial number is a sequence number (order number) assigned to each instance.

The block number is a sequence number (order number) assigned to each block.

(2) Round Accept Signal Transmission Step (ST2)

In the present step, the agents A-D that have received the round proposal signal perform processing for comparing the round value they has received (hereinafter, "received round value") with a round value stored therein (hereinafter, "stored round value") (S31), and for transmitting a round accept signal indicating acceptance of the received round value to the leader E when the received round value is greater than or equal to the stored round value (Yes in S31) (S32). In this case, i.e. when the received round value is greater than or equal to the stored round value, the agents A-D update the stored round value to the received round value.

On the other hand, when the above condition is not met (when the received round value is smaller than the stored round value) (No in S31), the agents A-D transmits a round denial signal to the leader E (S33).

The round accept signal is composed of a round accept type (commonly called Last) which is identification information for distinguishing between data types; a transmission source server device number (device numbers of the agents A-D); a transmission destination server device number (the device number of the leader E); a round value; a block number; and identification information of B number of instances (instance serial number, flag information, proposed round value, and proposal value metadata) (FIG. 6B).

On the other hand, the round denial signal is composed of data including: a round denial type (commonly called Old-Round1) which is identification information for distinguishing between data types; a transmission source server device number (device numbers of the agents A-D); a transmission destination server device number (the device number of the leader E); and a round value (FIG. 6C).

Furthermore, in the present step, the agents A-D perform the following processing after comparing the status of each instance in the leader E immediately before a leader change with the status of each instance therein. That is, while the status of each instance in the leader E is distinguished based on the flag information in the round proposal signal (hereinafter, simply "flag information"), the following processing is performed in accordance with the status of each instance in the agents A-D (hereinafter, "agent instance") (Table 1).

Note that after the leader E collects data indicating the status of execution of instances from the agents A-D, if there is an instance that was not processed upon winning the previous round, the above processing is performed to execute the unprocessed instance upon winning the current round.

When the flag information shows "determined" and the agent instance shows "determined", execution of the corresponding instance is already promised at the time of winning the previous round, and accordingly, the agents A-D generate a copy of the round proposal signal and transmit the contents of the copy as a round accept signal to the leader E.

When the flag information shows "determined" and the agent instance shows "being proposed" or "not proposed", the agents A-D generate a copy of the round proposal signal (excluding the transmission source server device number and the transmission destination server device number; this rule applies to the rest of the description), and transmit the contents of the copy as a round accept signal to the leader E. At this time, the agents A-D also transmit a determined data request signal to the leader E.

In this state, although consensus on instance execution (described later) has already been achieved, the agents A-D have not participated in the achievement of the consensus on the instance to be executed. This is why the agents A-D request the leader E to transmit the determined data including data necessary for executing the target instance (the agents A-D transmit the determined data request signal).

Note that the determined data request signal is composed of a determined data request type; a transmission source server device number; a transmission destination server device number; and an instance serial number (FIG. 7A).

When the flag information shows "being proposed" or "not proposed" and the agent instance shows "determined", the agents A-D correct the contents of the round proposal signal (the proposed round value and the proposal value metadata), and transmit the corrected contents as a round accept signal to the leader E. At this time, the agents A-D also transmit a determined data response signal to the leader E.

This state occurs when the leader changes. In this state, in order for the leader E to execute a target instance, the agents A-D transmit the determined data response signal including data necessary for executing the target instance to the leader E.

Note that the determined data response signal is composed of a determined data response type; a transmission source server device number; a transmission destination server device number; an instance serial number; proposal value metadata; and proposal value substance data (FIG. 7B).

When the flag information shows "being proposed" and the agent instance shows "not proposed", the process of achieving consensus on the corresponding instance is being carried out at that point; accordingly, the agents A-D generate a copy of the round proposal signal and transmit the contents of the copy as a round accept signal to the leader E.

When the flag information shows "being proposed" and the agent instance shows "being proposed", in accordance with the following normal processing method, the agents A-D generate a round accept signal by correcting the contents of the round proposal signal if the received round value is greater than or equal to the stored round value, and transmits the round accept signal to the leader E (it transmit a round denial signal if the received round value is smaller than the stored round value).

When the flag information shows "not proposed" and the agent instance shows "being proposed", there is an instance that is acknowledged by the agents A-D but has not been processed by the leader E. Therefore, the agents A-D correct the contents of the round proposal signal (the proposed round value and the proposal value metadata) to include information of the unprocessed instance, and transmit the corrected contents as a round accept signal to the leader E.

TABLE 1

| Flag Information in Round Proposal Signal | Status of Instance in Agents A-D | Processing of Agents A-D |
|---|---|---|
| Determined | Determined | Transmit contents of round proposal signal as round accept signal to leader. |
| Determined | Being Proposed or Not Proposed | Transmit contents of round proposal signal as round accept signal to leader. Transmit determined data request signal to leader. |
| Being Proposed or Not Proposed | Determined | Generate round accept signal by correcting round proposal signal and transmit the same to leader. Transmit determined data response signal to leader. |
| Being Proposed | Not Proposed | Transmit contents of round proposal signal as round accept signal to leader. |
| Being Proposed | Being Proposed | If stored round value is greater than received round value, generate round accept signal by correcting round proposal signal and transmit the same to leader. |
| Not Proposed | Being Proposed | Generate round accept signal by correcting round proposal signal and transmit the same to leader. |

(3) Round-Winning Judgment Step (ST3)

In the present step, the leader E performs processing for judging whether or not a condition regarding reception of a round accept signal is satisfied, on the basis of whether or not the number of agents A-D constituting the cell P from which the leader E has received the round accept signal is greater than or equal to a number obtained by subtracting one from the majority of the servers A-E (S34).

As the leader E itself has transmitted the proposed round value corresponding to the round accept signal to the agents A-D, it naturally accepts the proposed round value when performing the above processing. Therefore, the Paxos algorithm reaches consensus on winning the round (hereinafter, "round-winning consensus") under the condition that a total number of the leader E plus the agents from which the leader E has received the round accept signal equals the majority of the servers A-E constituting the cell P (in the present embodiment, the majority is three out of five servers; hereinafter, this majority is referred to as "quorum").

Note that the servers constituting the cell P normally denote the leader E and the agents A-D at the time of initial operations of the present system S.

In the present step, when it is judged that the above condition regarding reception of the round accept signal is satisfied (Yes in S34), the processing moves to an instance proposal signal transmission step (ST4).

On the other hand, when the leader E has not received the round accept signal from the servers constituting the above-described quorum (No in S34), it does not achieve the round-winning consensus on execution of the group of instances based on the round value. At this time, when the leader E remains as the leader, it changes the round value to have a larger value and retransmits the round proposal signal to the agents A-D after a predetermined time period has elapsed (S30). Consequently, the round accept signal transmission step (ST2) is performed again. When the leadership has switched from the leader E to another leader, another leader takes control.

(Achievement of Consensus on Instance)

The subsequent steps aim to achieve consensus on each instance targeted for execution after the round-winning consensus is achieved. Execution of each instance requires achievement of consensus on execution of the instance using the Paxos algorithm.

The following steps are composed of an instance proposal signal transmission step (ST4), an instance accept signal transmission step (ST5), an instance consensus judgment step (ST6), and an instance execution instruction signal transmission step (ST7) (FIG. 3).

(4) Instance Proposal Signal Transmission Step (ST4)

In the present step, when the leader E has received the round accept signal from the servers constituting a quorum (Yes in S34) in the round-winning judgment step (ST3), the leader E judges that the round-winning consensus has been achieved, and performs processing for transmitting, to the agents A-D, an instance proposal signal including the round value and identification information of an instance that is targeted for execution and selected in accordance with a desired order (S35).

Processing performed in the present step differs depending on the status of processing of the instances in the leader E and the agents A-D, which has been described above in the round accept signal transmission step (ST2).

When the flag information of the leader E shows "determined" and the agent instance shows "determined", the following steps are unnecessary because execution of the corresponding instance is already promised at the time of winning the previous round.

When the flag information of the leader E shows "determined" and the agent instance shows "being proposed" or "not proposed", the agents A-D transmit a determined data request signal to the leader E. Upon receiving the determined data request signal, the leader E transmits the determined data to the agents A-D that have made the request. Upon receiving the determined data, the agents A-D execute the instance by using the determined data (in this case, the following steps are unnecessary because consensus is already achieved on the instance in the present system S).

When the flag information shows "being proposed" or "not proposed" and the agent instance shows "determined", the agents A-D transmit, to the leader E, a determined data response signal including data necessary for executing the instance. Upon receiving the determined data response signal, the leader E executes the instance by using the data (in this case, the following steps are unnecessary because consensus is already achieved on the instance in the present system S).

When the flag information shows "being proposed" (or "not proposed"), or when the agent instance shows "being proposed" (or "not proposed") (note, the flag information and the agent instance do not show "not proposed" at the same time), it means that the instances currently being proposed were instructed before the leader change. Therefore, in order to prioritize processing on these instances, the leader E transmits an instance proposal signal with respect to these instances to the agents A-D.

After processing of these instances is completed, the leader E transmits an instance proposal signal with respect to the instances instructed after the leader change to the agents A-D.

In the present step, when transmitting the above instance proposal signal, the leader E performs independent control whereby it successively transmits the instance proposal signal to the agents A-D in accordance with the order of the instance serial numbers (ascending order), without waiting for satisfaction of a condition regarding reception of an instance accept signal (described later).

The instance proposal signal is composed of data including: an instance proposal type (commonly called Begin) which is identification information for distinguishing between data types; a device number of a return destination server to which the instance accept signal should be returned; a transmission source server device number (the device number of the leader E); the round value; and information of the instance targeted for execution (instance serial number, proposal value metadata, and proposal value substance data) (FIG. 8A).

Note, the proposal value substance data is actual data necessary for executing the target instance, and is associated with the proposal value metadata by the instance serial number.

Incidentally, the leader E generally holds the proposal value substance data. However, a leader change during processing may result in a situation where the new leader does not hold the proposal value substance data. In this case, the new leader transmits an instance proposal substitution signal to the agent that holds the proposal value substance data, and causes that agent to transmit the proposal value substance data to another agent to which it should be transmitted.

The instance proposal substitution signal is composed of data including: an instance proposal substitution type (commonly called Begin redirect) which is identification information for distinguishing between data types; a transmission source server device number; a transmission destination server device number; a device number of a return destination server to which the instance accept signal should be returned when acquiring the proposal value substance data (normally, the device number of the leader E); the round value; and the instance serial number of the instance targeted for execution (FIG. 8B).

(5) Instance Accept Signal Transmission Step (ST5)

In the present step, the agents A-D perform processing for comparing the round value they have received in connection with each target instance (received round value) with the stored round value (S36), and when the received round value is greater than or equal to the stored round value (Yes in S36), transmitting an instance accept signal to the leader E (S37).

On the other hand, when the received round value is smaller than the stored round value (No in S36), the agents A-D transmit an instance denial signal to the leader E (S38). When the leader E remains as the leader at the time of reception of the instance denial signal, it changes the stored round value to be greater than the original round value and retransmits the round proposal signal to the agents A-D after a predetermined time period has elapsed (S30). Consequently, the round accept signal transmission step (ST2) is performed again. When the leadership has switched from the leader E to another leader, another leader takes control.

The instance acceptance signal is composed of data including: an instance acceptance type (commonly called Accept) which is identification information for distinguishing between data types; a transmission source server device number (device numbers of the agents A-D); a transmission destination server device number (the device number of the leader E); and an instance serial number of the instance targeted for execution (FIG. 9A).

On the other hand, the instance denial signal is composed of data including: a round denial type (commonly called OldRound2) which is identification information for distinguishing between data types; a transmission source server device number (device numbers of the agents A-D); a transmission destination server device number (the device number of the leader E); and a round value (FIG. 9B).

(6) Instance Consensus Judgment Step (ST6)

Figure 5:
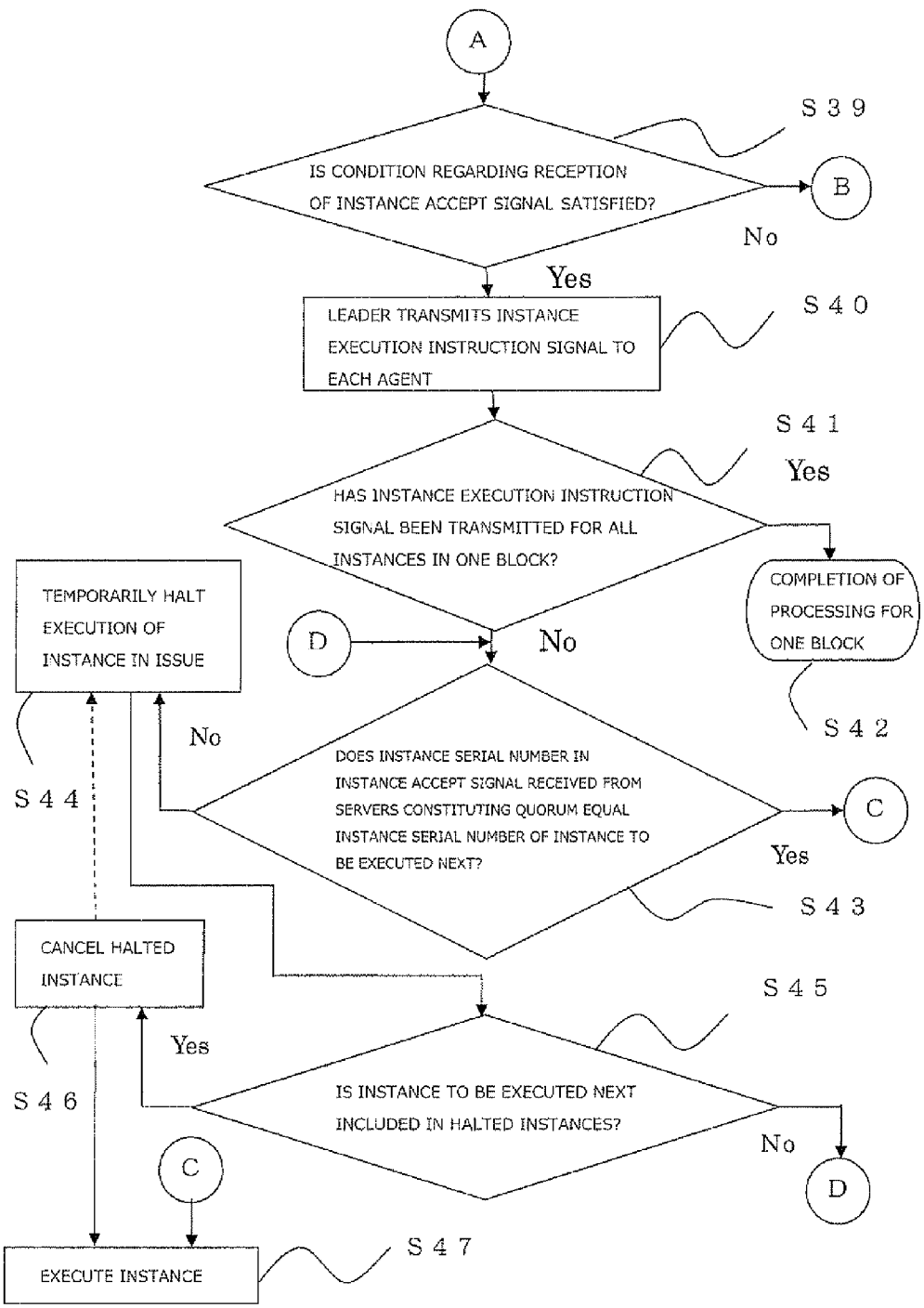
FIG. 5 is a flow diagram showing the details of the processing method for the distributed computing of the present invention, continuing from FIG. 4.

As shown in FIG. 5, in the present step, the leader E performs processing for judging whether or not a condition regarding reception of the instance accept signal is satisfied, on the basis of whether or not the number of agents A-D constituting the cell P from which the leader E has received the instance accept signal is greater than or equal to a number obtained by subtracting one from the majority of the servers A-E (S39).

As the leader E itself has transmitted the instance corresponding to the instance accept signal to each agent, it naturally accepts execution of this instance (hereinafter, "consensus on instance execution"). Therefore, the Paxos algorithm reaches consensus on instance execution under the condition that a total number of the leader E plus the agents from which the leader E has received the instance accept signal equals the majority of the servers constituting the cell.

On the other hand, when the above condition regarding reception of the instance accept signal is not satisfied (No in S39), consensus on instance execution is not achieved for the corresponding instance serial number. Therefore, when the leader E remains as the leader, it changes the stored round value to be greater than the original round value and retransmits the round proposal signal to the agents A-D after a predetermined time period has elapsed (S30). Consequently, the round accept signal transmission step (ST2) is performed again ("B" in FIGS. 4 and 5). When the leadership has switched from the leader E to another leader, another leader takes control.

(7) Instance Execution Instruction Signal Transmission Step (ST7)

In the present step, when the condition regarding reception of the instance accept signal is satisfied (Yes in S39), it is judged that consensus on instance execution has been achieved with respect to execution of the instance with the predetermined serial number. Then, the leader E performs processing for transmitting, to the agents A-D, an instance execution instruction signal with respect to the instance with the predetermined serial number for which the instance accept signal has been transmitted (S40). This processing is continued until consensus is achieved on all of B number of consecutive instances constituting one block (S41).

The instance execution instruction signal is composed of data including: an execution instruction type (commonly called Success) which is identification information for distinguishing between data types; a transmission source server device number (the device number of the leader E); a transmission destination server device number (device numbers of the agents A-D); and information of the instance targeted for execution (instance serial number, proposal value metadata, and proposal value substance data) (FIG. 9C).

Thereafter, when the instance execution instruction signal has been transmitted for all of the instances constituting one block, the processing for this block is considered to be completed (S42). Then, the servers A-E update its own block and return to the above instance proposal signal transmission step (ST4). Subsequently, the above-described processing is performed again.

(Execution of Instance)

(8) Instance Execution Step (ST8)

In the present step, when the leader E judges that the above condition regarding reception of the instance accept signal is satisfied (Yes in S39), the leader E and the agents A-D perform processing as follows (S47). Upon satisfaction of this condition regarding reception of the instance accept signal, the leader E executes the instances targeted for execution in the ascending order of the instance serial numbers thereof.

Upon receiving the instance execution instruction signal from the leader E, the agents A-D execute the target instances in the ascending order of the instance serial numbers thereof.

Control on Ascending Order of Execution of Instances

As has been described above, the present system S adopts programming with which B number of consecutive instances are executed in the ascending order of the serial numbers thereof.

Meanwhile, as mentioned earlier, the leader E successively transmits the instance proposal signal in accordance with the order of the instance serial numbers, without waiting for satisfaction of the condition regarding reception of the instance accept signal transmitted from the agents A-D (independent control). At this time, consensus may not be achieved on execution of instances in accordance with the order of the instance serial numbers thereof, depending on the status of operations of the agents or the status of communication lines. Therefore, a judgment is made as to whether or not the instance serial number in the instance accept signal received from the servers constituting a quorum is the instance serial number of the instance succeeding the latest instance executed (hereinafter, "instance targeted for next execution") (S43). If this condition is satisfied (Yes in S43), the instance targeted for next execution is executed (S47).

On the other hand, when the instance serial number in the instance accept signal received from the servers constituting a quorum is not the instance serial number of the instance targeted for next execution (when they do not match) (No in S43), execution of the instance targeted for next execution is temporarily halted until consensus is achieved on the same (S44). Each of the servers A-E does not execute the instance targeted for next execution until a condition regarding reception of the instance accept signal is satisfied for the instance targeted for next execution (until consensus is achieved on execution of the instance targeted for next execution). The instance targeted for next execution is executed for the first time when the condition regarding reception of the instance accept signal is satisfied for the instance targeted for next execution (in the case of the leader E), or when receiving the instance execution instruction signal therefor (in the case of the agents A-D).

Here, while execution of instances is in progress, there may be cases where consensus is already achieved on execution of these instances and a large number of executable instances are halted. In such cases, it is checked whether or not the instance targeted for next execution is included in the executable instances that have been halted (S45). When the instance targeted for next execution is included (Yes in S45), the halted state of this instance is cancelled (S46), and this instance is executed (S47).

On the other hand, when the instance targeted for next execution is not included in the executable instances that have been halted (No in S45), the above processing for instances is continuously performed (D in FIG. 5).

As set forth above, an instance targeted for execution is executed based on the above-described instance execution instruction signal. Each instance is assigned an instance serial number, and the instance execution instruction signal includes substance data for executing the instance. Hence, by application of an instance corresponding to the instance serial number targeted for execution, processing therefor is performed.

Effects And Advantages

In the present invention, once a round is won to execute a plurality of instances, processing for winning the round is no longer required when executing each instance, as long as there is no change in the leader. Accordingly, it is possible to execute the instances in succession in a given order of execution, thereby increasing the speed of processing therefor.

It is necessary to satisfy a condition regarding the instance accept signal in order to execute a target instance. Incidentally, while the present invention is embodied under the premise that the instances are executed in a predetermined order of execution (in the present embodiment, in the ascending order of the instance serial numbers), the present invention employs the independent control whereby the instance proposal signal is successively transmitted for instances other than the instance to be executed next in accordance with the order of execution, without confirming that this instance to be executed next satisfies the condition regarding the instance accept signal. As the independent control is thus performed under the assumption that consensus has been achieved using the Paxos algorithm, the instances can be multi-processed, thus enabling parallel processing of the instances. As a result, the wait time required to achieve consensus on execution of instances can be made as short as possible, and accordingly, a plurality of instances can be promptly executed.

Furthermore, as to the data constituting the round proposal signal and the round accept signal, in the course of winning a round, the proposal value metadata is used as data of the identification information of an instance, which is necessary for identifying the contents of an instance to be executed. In this way, consensus can be promptly achieved according to the Paxos algorithm, even when using a communication method with a limited communication capacity.

A preferred embodiment of the present invention has been described above as an example. However, the present invention is by no means limited to the above embodiment, and various changes may be made as appropriate without departing from the purport of the present invention.

The above embodiment has provided an example in which the present system is constituted by five servers. However, the types and the number of such servers should not be limited to these, as long as the present system is constituted by a plurality of computing devices. In addition, a plurality of information processing devices may be connected by any means of connection other than the Internet and LAN.

Note that the present application claims the benefit of priority from Japanese Patent Application No. 2010-173944, filed Aug. 2, 2010, the disclosure of which is incorporated herein by reference in its entirety.

Industrial Applicability

The present invention is widely applicable to a processing method for a distributed computing system using the Paxos algorithm, regardless of types of instances.

| Reference Signs List | |
| --- | --- |
| S | distributed computing system |
| K | client |
| A, B, C, D | server (agent) |
| E | server (leader) |
| P | cell |
| 4A, 4B, 4C, 4D, 4E | consensus achievement unit |
| 5A, 5B, 5C, 5D, 5E | execution unit |

The invention claimed is:

1. A processing method for a distributed computing system including a plurality of computing devices constituting a cell, a part of the plurality of computing devices acting as a leader and the remaining computing devices acting as agents, the distributed computing system determining a group of instances composed of a plurality of instances to be executed by the plurality of computing devices through achievement of consensus with use of a Paxos algorithm and executing the group of instances in a predetermined order of execution, the processing method for the distributed computing system comprising:

- a round proposal signal transmission step in which the leader transmits, to each agent, a round proposal signal including a round value and identification information of the group of instances, the round value being a proposal number indicating contents of the group of instances to be executed, the group of instances being grouped to include a predetermined number of instances;
- a round accept signal transmission step in which each agent compares the received round value with a round value stored therein, and when the received round value is greater than or equal to the stored round value, transmits a round accept signal indicating acceptance of the received round value to the leader;
- a round-winning judgment step in which the leader judges whether or not a condition regarding reception of the round accept signal is satisfied, on the basis of whether or not the number of agents from which the leader has received the round accept signal is greater than or equal to a number obtained by subtracting one from a majority of the computing devices constituting the cell;
- an instance proposal signal transmission step in which, when the condition regarding reception of the round accept signal is satisfied, an instance proposal signal is successively transmitted to each agent in accordance with a desired order, the instance proposal signal including the round value and substance data that is associated with the identification information of a target instance among the group of instances and is necessary for execution of the target instance;
- an instance accept signal transmission step in which, upon receiving the instance proposal signal, each agent compares the round value corresponding to each instance with a round value stored therein, and when the received round value is greater than or equal to the stored round value, transmits an instance accept signal indicating acceptance of execution of the target instance to the leader;
- an instance consensus judgment step in which the leader judges whether or not a condition regarding reception of the instance accept signal is satisfied, on the basis of whether or not the number of agents from which the leader has received the instance accept signal is greater than or equal to the number obtained by subtracting one from the majority of the computing devices constituting the cell;
- an instance execution instruction signal transmission step in which, when the condition regarding reception of the instance accept signal is satisfied, an instance execution instruction signal is transmitted to each agent so as to instruct each agent to execute the target instance in the predetermined order of execution until the number of executed target instances reaches the predetermined number; and
- an instance execution step in which, upon receiving the instance execution instruction signal, each agent executes the target instance, wherein
- in the instance proposal signal transmission step, the leader transmits the instance proposal signal for other instances without confirming satisfaction of the condition regarding reception of the instance accept signal.

2. The processing method for the distributed computing system of claim 1,
- wherein the identification information of the group of instances included in the round proposal signal is composed of metadata.

* * * * *

UNITED STATES PATENT AND TRADEMARK OFFICE
CERTIFICATE OF CORRECTION

PATENT NO.         : 8,745,126 B2
APPLICATION NO.    : 13/474122
DATED              : June 3, 2014
INVENTOR(S)        : Noritaka Watanabe Page 1 of 1

It is certified that error appears in the above-identified patent and that said Letters Patent is hereby corrected as shown below:

On the title page please change item (73) Assignee from "Tribeth Inc." to "Tritech Inc."

Signed and Sealed this
Twenty-sixth Day of August, 2014

Michelle K. Lee
*Deputy Director of the United States Patent and Trademark Office*